US006633767B2

(12) United States Patent
Vishwanathan et al.

(10) Patent No.: US 6,633,767 B2
(45) Date of Patent: Oct. 14, 2003

(54) SYSTEM AND METHOD OF MANAGING INTERCONNECTIONS IN MOBILE COMMUNICATIONS

(75) Inventors: Kumar K. Vishwanathan, Windham, NH (US); Murali Aravamudan, Windham, NH (US); Shamim A. Naqvi, Morristown, NJ (US); Todd Andrew Snide, Pelham, NH (US)

(73) Assignee: Winphoria Networks, Inc., Tewksbury, MA (US)

( * ) Notice: Subject to any disclaimer, the term of this patent is extended or adjusted under 35 U.S.C. 154(b) by 114 days.

(21) Appl. No.: 09/850,325

(22) Filed: May 7, 2001

(65) Prior Publication Data
US 2002/0164988 A1 Nov. 7, 2002

(51) Int. Cl.[7] .................................................. H04B 1/38
(52) U.S. Cl. .................. 455/560; 455/561; 455/445; 455/422
(58) Field of Search ................................ 455/560, 561, 455/555, 422, 445, 446, 461, 462, 428, 430

(56) References Cited

U.S. PATENT DOCUMENTS

| 5,625,623 | A | * | 4/1997 | Kent et al. ................... 455/557 |
| 5,666,399 | A | | 9/1997 | Bales et al. .................. 379/419 |
| 5,670,950 | A | | 9/1997 | Otsuka .................. 340/825.33 |
| 5,768,380 | A | | 6/1998 | Rosauer et al. ............... 380/21 |
| 5,950,136 | A | | 9/1999 | Scott .......................... 455/452 |
| 6,061,566 | A | * | 5/2000 | Friman ..................... 455/445 |
| 6,070,187 | A | * | 5/2000 | Subramaniam et al. ...... 709/220 |
| 6,073,014 | A | | 6/2000 | Blanchard et al. ........... 445/428 |
| 6,178,166 | B1 | | 1/2001 | Wilson et al. ............... 370/335 |
| 6,226,677 | B1 | * | 5/2001 | Slemmer ..................... 709/227 |
| 6,330,232 | B1 | | 12/2001 | Fapojuwo .................... 370/342 |
| 6,345,281 | B1 | | 2/2002 | Kardos et al. ............... 707/201 |
| 6,396,815 | B1 | * | 5/2002 | Greaves et al. .............. 370/256 |
| 6,405,041 | B1 | * | 6/2002 | Mukerjee et al. ............ 455/445 |

FOREIGN PATENT DOCUMENTS

| WO | WO98/25422 | 6/1998 | ............ H04Q/7/28 |
| WO | WO00/13356 | 3/2000 | ............ H04J/3/12 |
| WO | WO01/39443 | 5/2001 | ............ H04L/12/66 |

* cited by examiner

Primary Examiner—Vivian Chin
Assistant Examiner—John J Lee
(74) Attorney, Agent, or Firm—Hale and Dorr LLP

(57) ABSTRACT

Interconnections are managed in a mobile communications network. A first connection is provided between a first device and a second device in the network. The first device includes a proxy switch for use in the network. The proxy switch includes signaling message handling logic for receiving messages in accordance with a mobile signaling protocol. A second connection is provided between the first device and a third device in the network. It is determined that a condition exists in the network that affects the operation of the first device. A third connection is established between the second device and the third device in the network.

27 Claims, 13 Drawing Sheets

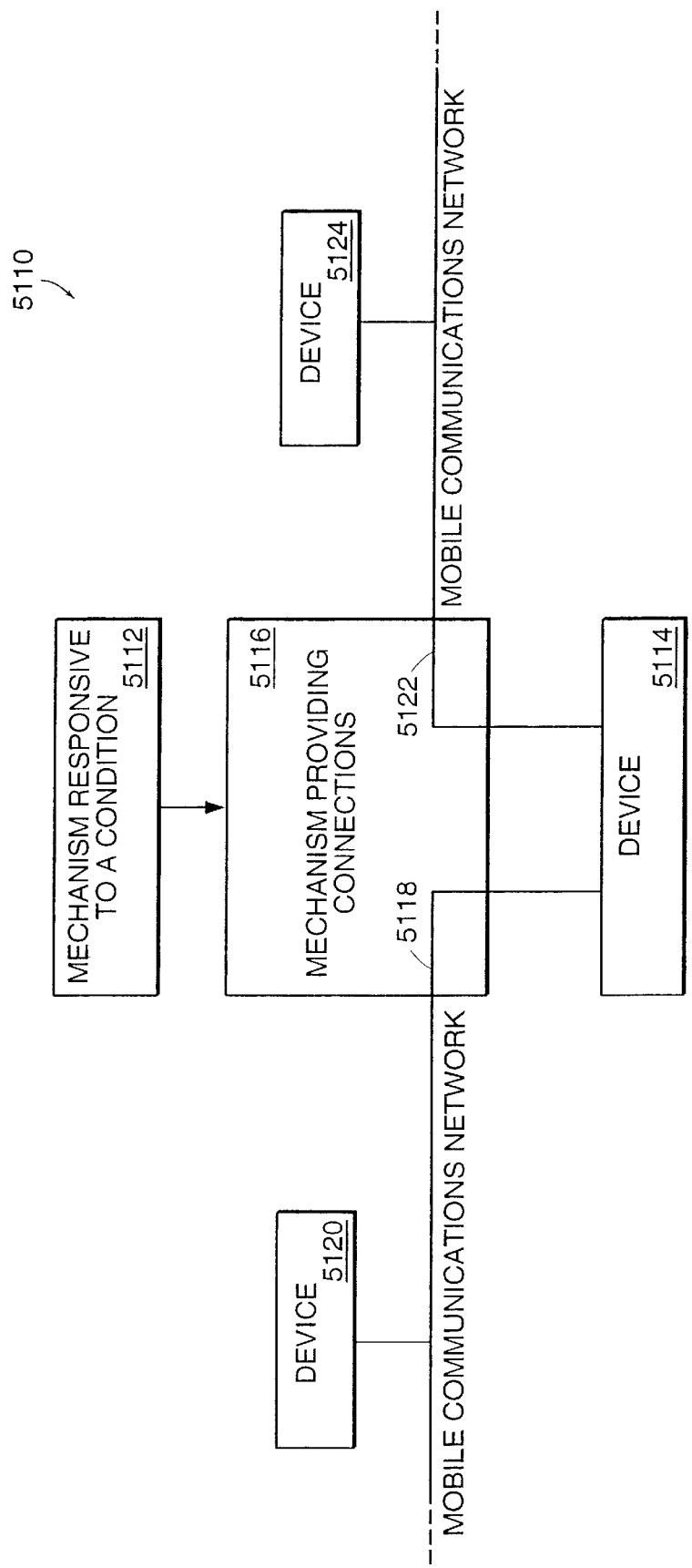

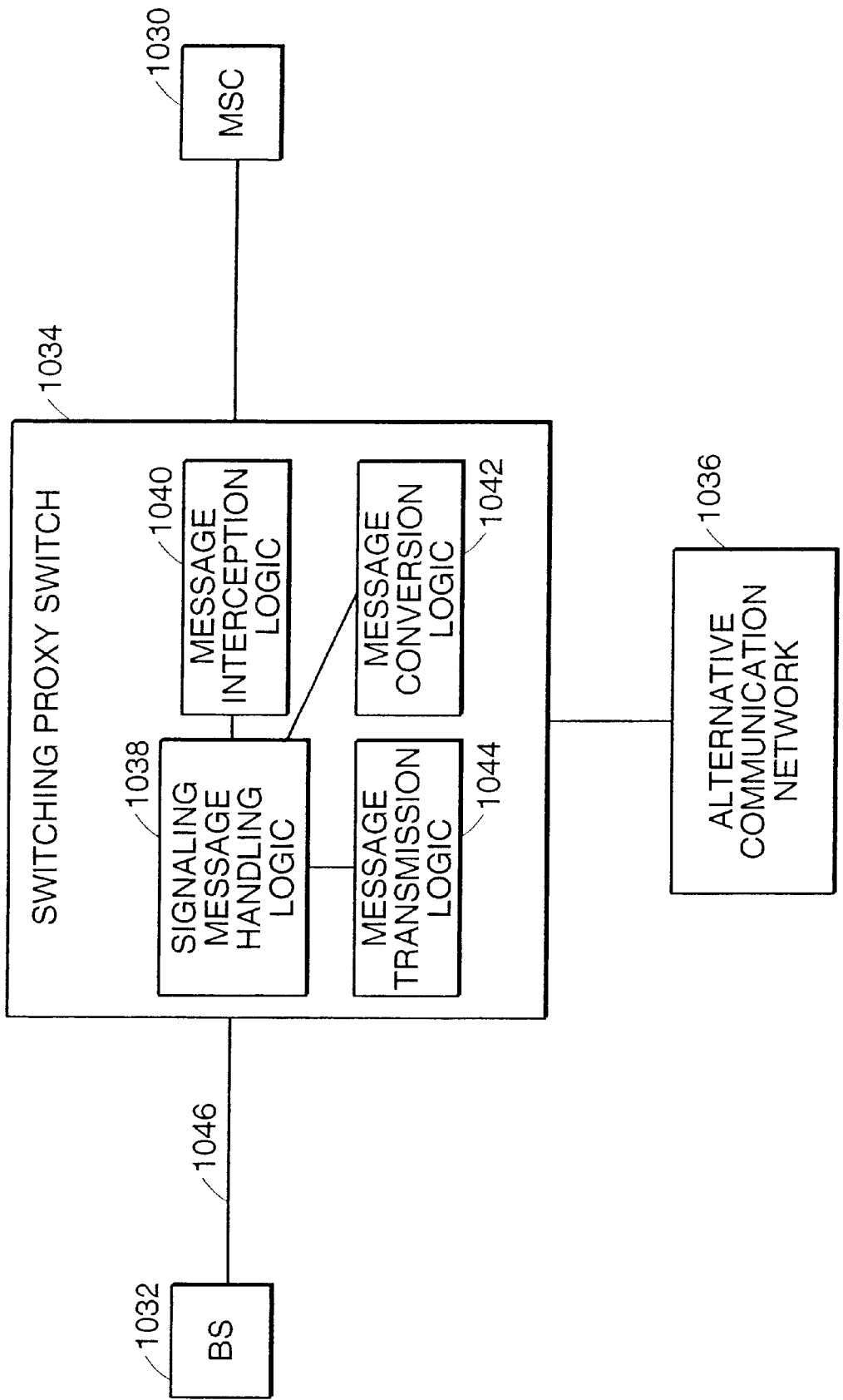

SYSTEM AND METHOD OF MANAGING INTERCONNECTIONS IN MOBILE COMMUNICATIONS

BACKGROUND OF THE INVENTION

1. Field of the Invention

This invention relates to mobile communications and, more particularly, to a system and method of managing interconnections in a mobile communication network.

2. Discussion of Related Art

All modern mobile communication systems have a hierarchical arrangement, in which a geographical "coverage area" is partitioned into a number of smaller geographical areas called "cells." Referring to FIG. 1, each cell is preferably served by a Base Transceiver Station ("BTS") 102*a*. Several BTS 102*b–n* are aggregated via fixed links 104*a–n* into a Base Station Controller ("BSC") 106*a*. The BTSs and BSC are sometimes collectively referred to as the Base Station Subsystem ("BS") 107. Several BSCs 106*b–n* may be aggregated into a Mobile Switching Center ("MSC") 110 via fixed links 108*a–n*.

MSC 110 acts as a local switching exchange (with additional features to handle mobility management requirements, discussed below) and communicates with the phone network ("PSTN") 120 through trunk groups. Under U.S. mobile networks, there is a concept of a home MSC and a Serving MSC. The home MSC is the MSC corresponding to the exchange associated with a Mobile Station ("MS"); this association is based on the phone number, e.g., area code, of the MS. (The home MSC is responsible for the HLR discussed below.) The Serving MSC, on the other hand, is the exchange used to connect the MS call to the PSTN (as the subscriber roams in the area covered by the service provider, different MSCs perform the function of the Serving MSC). Consequently, sometimes the home MSC and the Serving MSC are the same entity, but other times they are not (e.g., when the MS is roaming). Typically, a Visiting Location Register ("VLR") 116 is co-located with the MSC 110 and a logically singular HLR is used in the mobile network. As will be explained below, the HLR and VLR are used for storing many types of subscriber information and profiles.

Briefly, one or more radio channels 112 are associated with the entire coverage area. The radio channels are partitioned into groups of channels allocated to individual cells. The channels are used to carry signaling information to establish call connections and the like, and to carry voice or data information once a call connection is established.

At a relatively high level of abstraction, mobile network signaling involves at least two main aspects. One aspect involves the signaling between an MS and the rest of the network. With 2G ("2G" is the industry term used for "second generation") and later technology, this signaling concerns access methods used by the MS (e.g., time-division multiple access, or TDMA; code-division multiple access, or CDMA), assignment of radio channels, authentication, etc. A second aspect involves the signaling among the various entities in the mobile network, such as the signaling among MSCs, VLRs, HLRs, etc. This second part is sometimes referred to as the Mobile Application Part ("MAP") especially when used in the context of Signaling System No. 7 ("SS7").

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (more below) to determine if the MS 114 is allowed the requested service. The Serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to a MS 114, (assuming that the call originates from the PSTN 120) the PSTN user dials the MS's associated phone number. At least according to U.S. standards, the PSTN 120 routes the call to the MS's home MSC (which may or may not be the one serving the MS). The MSC then interrogates the HLR 118 to determine which MSC is currently serving the MS. This also acts to inform the serving MSC that a call is forthcoming. The home MSC then routes the call to the Serving MSC. The serving MSC pages the MS via the appropriate BS. The MS responds and the appropriate signaling links are setup.

During a call, the BS 107 and MS 114 may cooperate to change channels or BTSs 102, if needed, for example, because of signal conditions. These changes are known as "handoffs," and they involve their own types of known messages and signaling.

One aspect of MAP involves "mobility management." Briefly, different BSs and MSCs may be needed and used to serve an MS, as the MS 114 roams to different locations. Mobility management ensures that the Serving MSC has the subscriber profile and other information the MSC needs to service (and bill) calls correctly. To this end, MSCs use a Visiting Location Register ("VLR") 116 and a Home Location Register ("HLR") 118. The HLR is used to store and retrieve the mobile identification number ("MIN"), the electronic serial number ("ESN"), MS status, and the MS service profile, among other things. The VLR stores similar information in addition to storing an MSC identification that identifies the (Home) MSC. In addition, under appropriate MAP protocols, location update procedures (or registration notifications) are performed so that the home MSC of a mobile subscriber knows the location of its users. These procedures are used when a MS roams from one location to another or when a MS is powered on and registers itself to access the network. For example a location update procedure may proceed with the MS 114 sending a location update request to the VLR 116 via the BS 107 and MSC 110. The VLR 116 sends a location update message to the HLR 118 serving the MS 114, and the subscriber profile is downloaded from the HLR 118 to the VLR 116. The MS 114 is sent an acknowledgement of a successful location update. The HLR 118 requests the VLR (if any) that previously held profile data to delete the data related to the relocated MS 114.

FIG. 2 shows in more detail the signaling and user traffic interfaces between a BS 107 and an MSC 110 in a CDMA mobile network. The BS 107 communicates signaling information using the A1 interface. The A2 interface carries the user traffic (e.g., voice signals) between the switch component 204 of the MSC and the BS 107. The A5 interface is used to provide a path for user traffic for circuit-switched data calls (as opposed to voice calls) between the source BS and the MSC.

Moreover, subscribers are demanding newer services, e.g., "data calls" to the Internet. For some of these services MSCs are not cost effective because they were primarily designed for voice calls. Integration of new services into the MSC is complicated or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Since the new service is expected to spur demand, integrating new services via MSC design changes or through trunk-side adjuncts is likely to exacerbate network congestion at the MSC and require costly MSC resources.

Making a change to an existing system can have an effect on the reliability or perceived reliability of the system. When the change is imposed on an existing telecom system, the resulting arrangement may have, or may be believed to have, an increased risk of failure. For example, a failure of the new arrangement may cause not only a loss of the capabilities intended to be provided by the change, but also a loss of some or all of the capabilities that had been provided by the system before the change.

SUMMARY

The invention generally provides systems and methods of mobile communication and specifically provides a system and method for use in managing interconnections in a mobile communications network. In a first aspect of the invention, a first connection is provided between a first device and a second device in the network and a second connection is provided between the first device and a third device in the network; a condition is determined to exist in the network that affects the operation of the first device; and a third connection is established between the second device and the third device in the network. In another aspect of the invention, a condition is determined to exist in the network that affects the operation of a device in the network; and the network is caused to operate in a manner that is consistent with the absence of the device from the network. In another aspect of the invention, a first mechanism is provided that is responsive to a condition existing in the network that affects the operation of a device in the network; and a second mechanism is provided that is responsive to the first mechanism and operative to electrically isolate the device from the network.

Accordingly, a mobile communications network may be provided with enhanced interconnection and fault recovery capabilities. In a telecom system using E1, T1, or J1 lines for communications, a bypass control switch according to the invention may serve as a connection (including an electrical and a mechanical connection) between the BSC and a device and between the device and the MSC. The bypass control switch may help to mitigate any actual or perceived increased risk of inserting the device into a telecom system. The bypass control switch may provide a mechanism for quickly achieving, without changing cable connections, an electrical signal isolation of the device from the BSC and the MSC together with an establishment of electrical signal connections between the BSC and the MSC. Thus, a quick reversion may be achieved to the telecom system as arranged prior to insertion of the device.

BRIEF DESCRIPTION OF THE DRAWING

In the Drawing,

FIGS. 3A–B illustrate an interconnection management system in a mobile network according to preferred embodiments of the invention;

FIGS. 4–5 illustrate a proxy switch and certain deployments in a mobile network;

DETAILED DESCRIPTION

Figure 1:
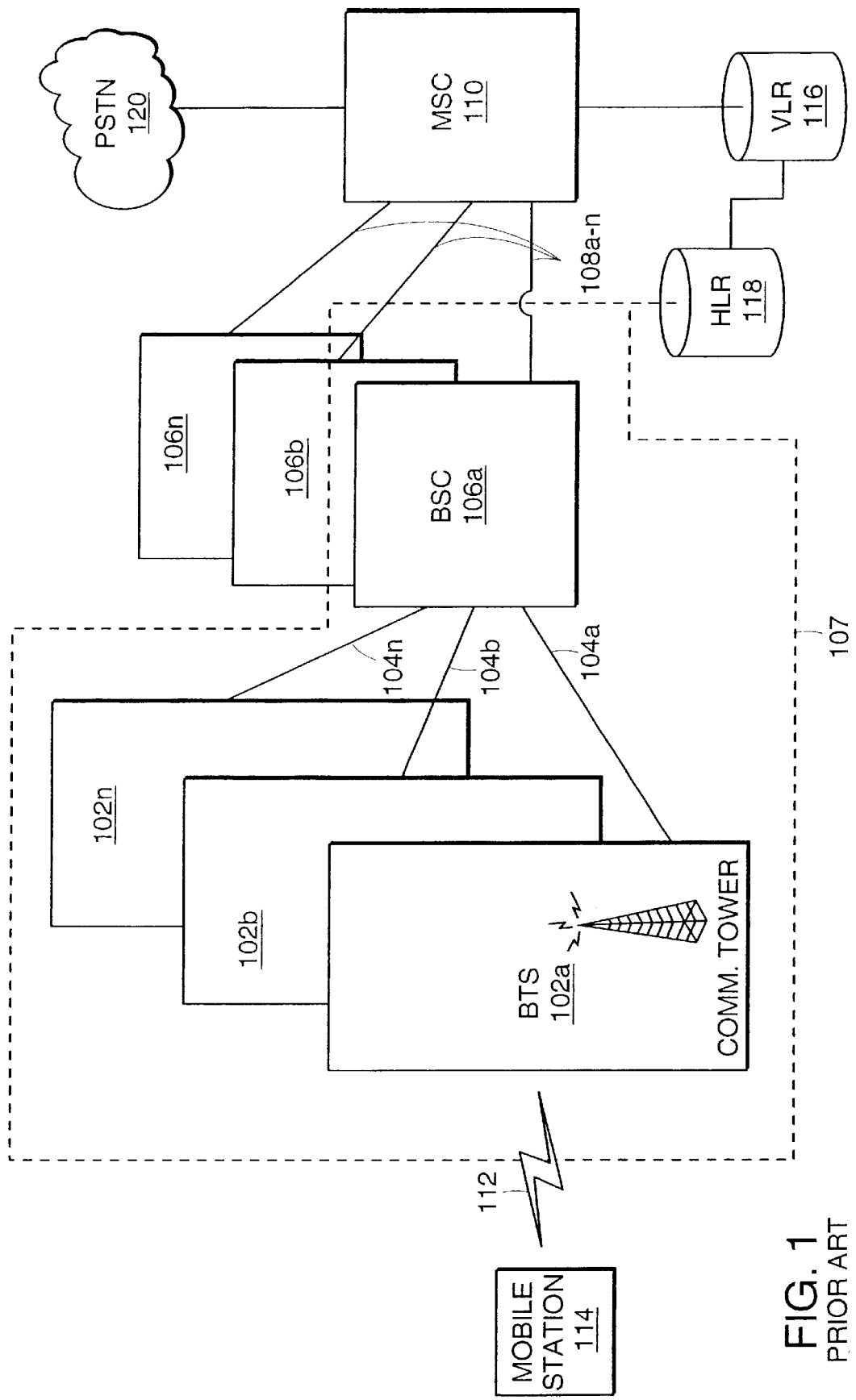
FIG. 1 is a system diagram of prior art mobile networks.
Figure 2:
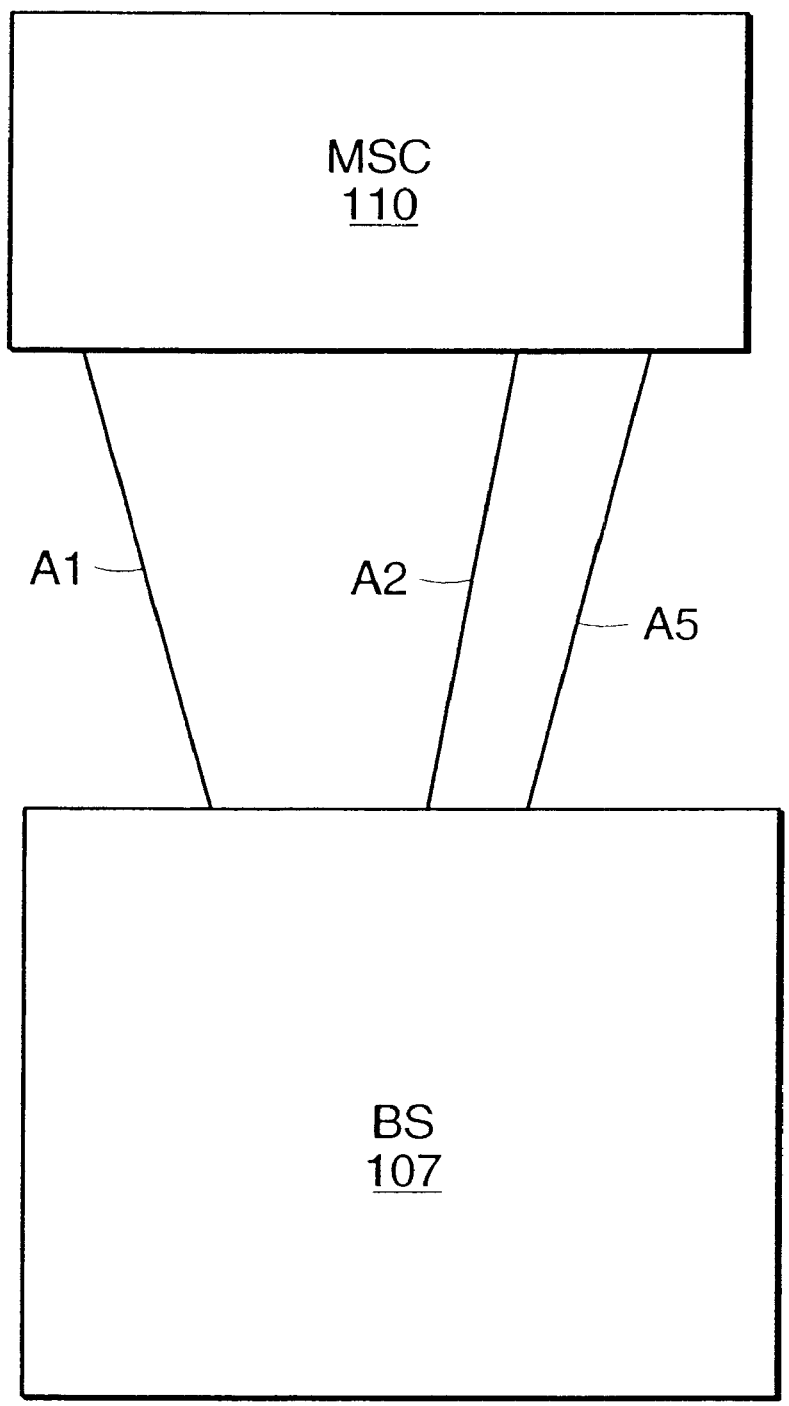
FIG. 2 illustrates a prior art interface between a BS and a mobile switching center in a prior art mobile network.
Figure 3B:
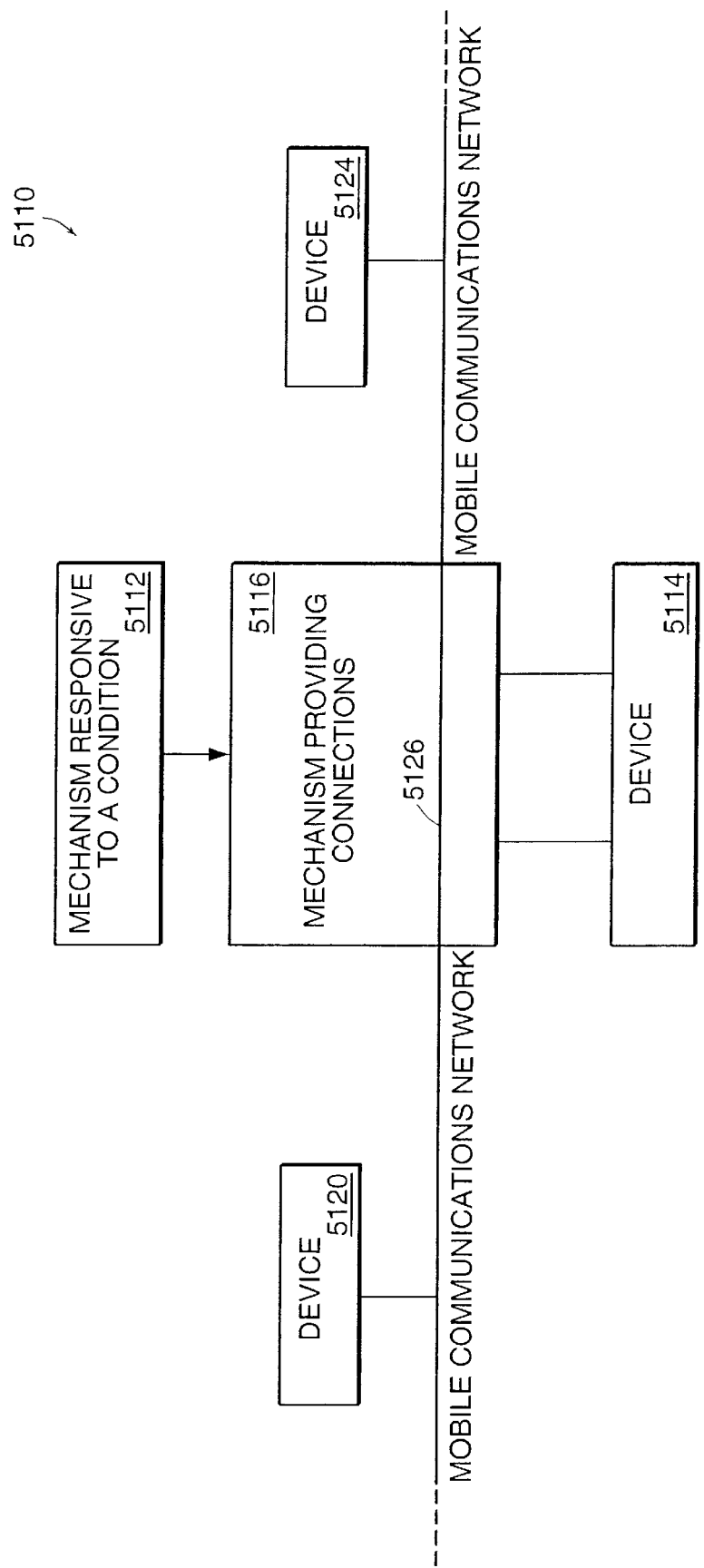

FIG. 3A illustrates a system and method for use in managing interconnections in a mobile communications network 5110. A first mechanism 5112 is provided that is responsive to a condition existing in the network that affects the operation of a device 5114 in the network, e.g., as described below. A second mechanism 5116 is provided that is responsive to the first mechanism 5112 and operative to electrically isolate the device 5114 from the network. In particular, the first mechanism 5112 provides a first connection 5118 between device 5114 and a second device 5120 in the network and a second connection 5122 between device 5114 and a third device 5124 in the network. As shown in FIG. 3B, first mechanism 5112 determines that a condition exists in the network that affects the operation of device 5114, and second mechanism 5116 electrically isolates device 5114 from the network and establishes a third connection 5126 between second device 5120 and third device 5124 in the network. Thus, the network is caused to operate in a manner that is consistent with the absence of device 5114 from the network.

Preferred embodiments of the invention provide interconnection management and fault recovery capabilities in a mobile communications network as described in detail below, e.g., for a proxy switch. With respect to the case in which the interconnection management is provided with a proxy switch, the proxy switch may operate as described in copending U.S. application Ser. No. 09/721329, entitled System and Method of Servicing Mobile Communications with a Proxy Switch, filed Nov. 22, 2000, which is incorporated herein by reference. The proxy switch is preferably positioned between an MSC and a BS, "transparent" to the other components, meaning that neither the BS or the MSC needs to know of the proxy switch nor do they need to alter their behavior or functionality because of the existence of the proxy switch. Instead, the BS and MSC operate as they do conventionally, ignorant of the existence of the proxy switch. As described in the copending application and illustrated in FIG. 4, switching 1034 operations are performed between at least one mobile switching center ("MSC") 1030 and at least one base station subsystem ("BS") 1032. The switching allows communication traffic to be siphoned to or from an alternative network 1036 such as an IP network. The switching is transparent so that neither the MSC nor the BS needs any changes to work with the inventive switching.

The proxy switch described the copending application includes signaling message handling logic 1038 to receive signaling messages from the MSC and BS in accordance with a mobile signaling protocol. Message interception logic 1040 cooperates with the signaling message handling logic and sends an acknowledgment message to an MSC or BS that transmitted a signaling message. The message interception logic also prevents the signaling messages from being forwarded to the other of the BS and MSC respectively. Message conversion logic 1042 cooperates with the signaling message handling logic and converts a signaling message from one of the MSC and BS into a converted signaling message for transmission to the other of the BS and MSC, respectively. Message transmission logic 1044 cooperates with the signaling message handling logic and transmits signaling messages from one of the MSC and the BS to the other of the BS and MSC, respectively.

A set of bearer circuits 1046 from the BS are allocated to the proxy switch. Signaling messages between the MSC and the BS are received and are analyzed to determine whether they correspond to the allocated set of bearer circuits. If so, control information in the signaling messages is conveyed to the alternative communication network; and information carried on the set of bearer circuits is siphoned to the alternative network.

Figure 5:
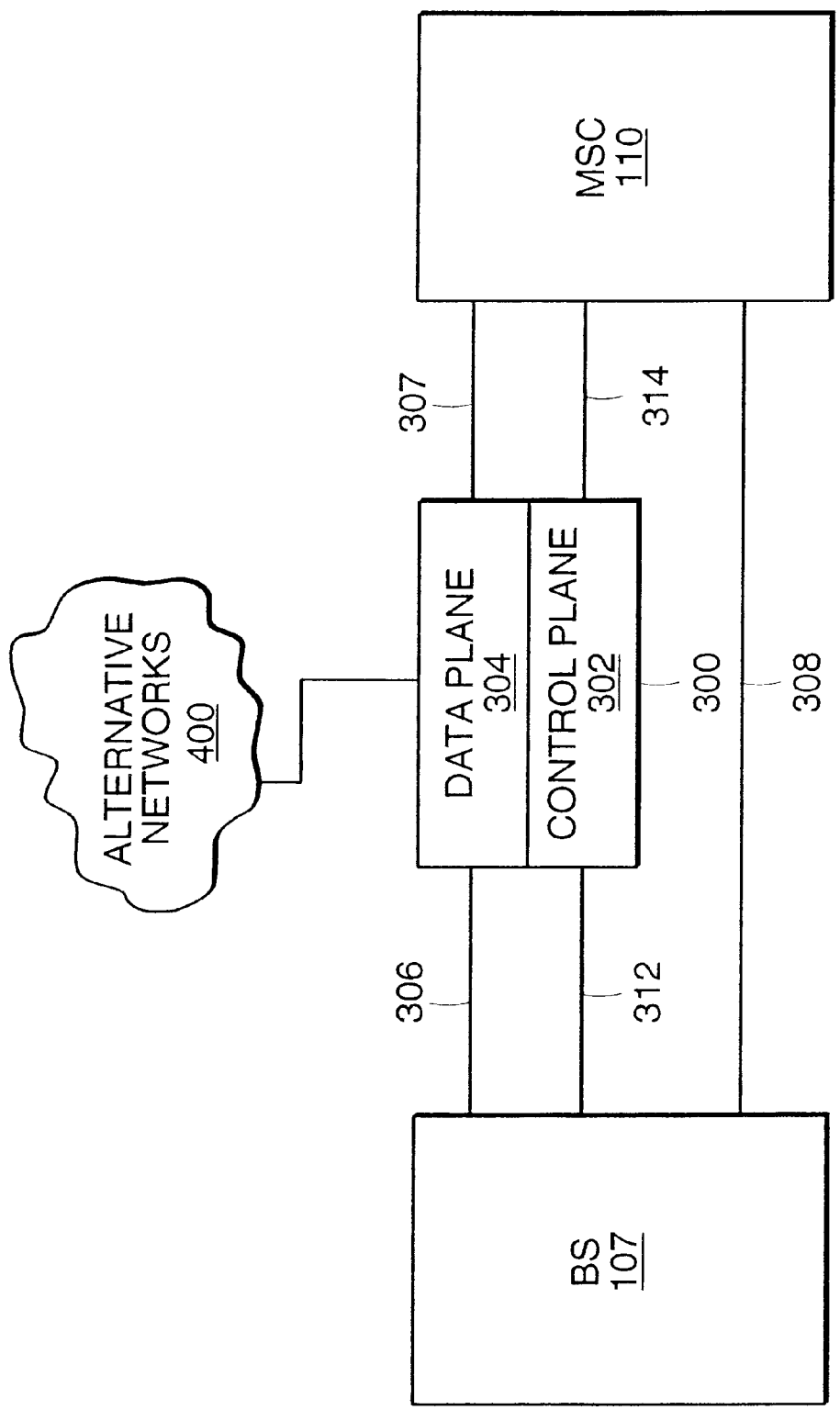

FIG. 5 shows one preferred deployment of a proxy switch 300, in which the proxy switch 300 is positioned between the BS 107 and the MSC 110. Only a subset of trunks 306 carrying user traffic needs to be terminated on the proxy switch; other trunks 308 may directly connect the MSC 110 and BS 107. All control links 312 from BS 107 terminate at proxy switch 300. The proxy switch includes a control plane 302 and a data plane 304 (also known as a "bearer plane"). The control plane 302 handles all the signaling traffic, and the data plane 304 handles all the user traffic for the trunks connected to the proxy switch.

Under certain embodiments, there is a one to one correspondence between an MSC and a proxy switch. Several BSs may work with a single proxy switch.

The proxy switch 300 includes software that accepts all signaling messages and, depending on the message and the state of the system, performs at least one of the following:

1. passes the message unaltered to the MSC or BS addressed in the message;
2. intercepts messages between the MSC and BS;
3. for some intercepted messages, converts the intercepted messages to a different message and sends the converted message in place of the original, intercepted message to the MSC or BS addressed in the intercepted message;
4. siphons the message from the mobile- and PSTN-based network to an alternative network such as an IP network.

The types of actions performed in each case along with the triggering events are described below.

In many instances, particularly when a message from an MS 114 is siphoned and the traffic is directed to an alternative network, the proxy switch 300 may act as an MSC 110. In such a role, the proxy switch fulfills the responsibilities and roles that a traditional MSC would perform. Some of these functions and roles pertain to mobility management. Consider the case of a roaming MS; as it roams from one cell to another, it may roam to a cell served by a different MSC, thus necessitating a handoff between the source and target MSCs. If the proxy switch 300 has siphoned the message and the call/session has been directed to an alternative network, then the handoff is managed by the proxy switch analogously to the way a handoff would be managed by a conventional MSC. The proxy switch causes the appropriate databases to be updated with the new location of the MS.

Another function of the proxy switch pertains to the assignment of resources. In particular, when an MS initiates a message requesting a new call/session, appropriate circuits (channels) need to be assigned for this session. Depending on the configuration of the system and the system state, the proxy switch makes such assignments analogously to the way conventional MSC assigns circuits.

Figure 6:
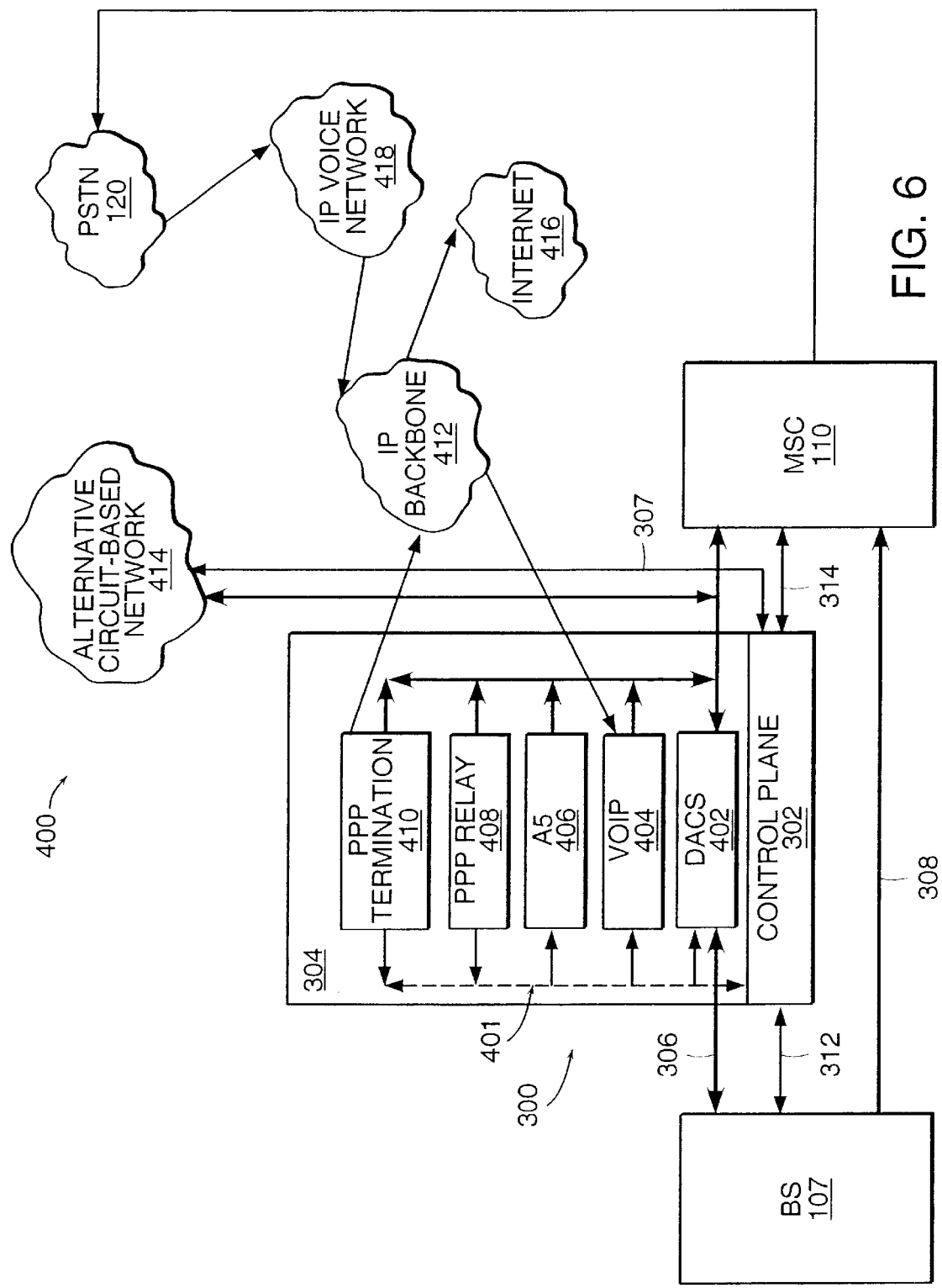
FIG. 6 illustrates an exemplary data plane of a proxy switch according to a preferred embodiment of the invention.

FIG. 6 shows an exemplary deployment in which the proxy switch 300 is connected to several alternative networks, such as an IP backbone 412 or an alternative circuit-based network 414, e.g., a different carrier. These alternative networks may be used to carry voice and/or data traffic to desired destinations while avoiding in whole or in part the PSTN 120 along with the costly resources of MSC 110. Alternatively, these arrangements may be used so that circuit traffic could be backhauled to a different network; for example, circuit traffic from Nashua, N.H. could be backhauled to an MSC in Waltham Mass. Or, they may be used to connect to other networks. For example, the IP backbone 412 may communicate with IP voice networks 418 or the Internet 416. As explained in the copending application, when siphoning traffic to an alternative network both control information (e.g., from the signaling messages) and voice or data from the bearer circuits on links 306 may be sent via an alternative network.

As described above, making a change to an old system can have an effect on the reliability or perceived reliability of the system. When a new device such as the proxy switch is inserted into an existing telecom system, the resulting arrangement may have an increased risk of failure or may be believed to have an increased risk of failure. For example, it may be, or it may be believed, that a failure of the new device may cause not only a loss of the capabilities provided by the new device, but also a loss of some or all of the capabilities that had been provided by the system before insertion of the new device. Thus, it may be advantageous for the administrator of the system, i.e., the telecom provider in the case of a telecom system, to have a highly reliable mechanism that facilitates the administrator's insertion and removal of the new device, particularly in response to problems.

Figure 7:
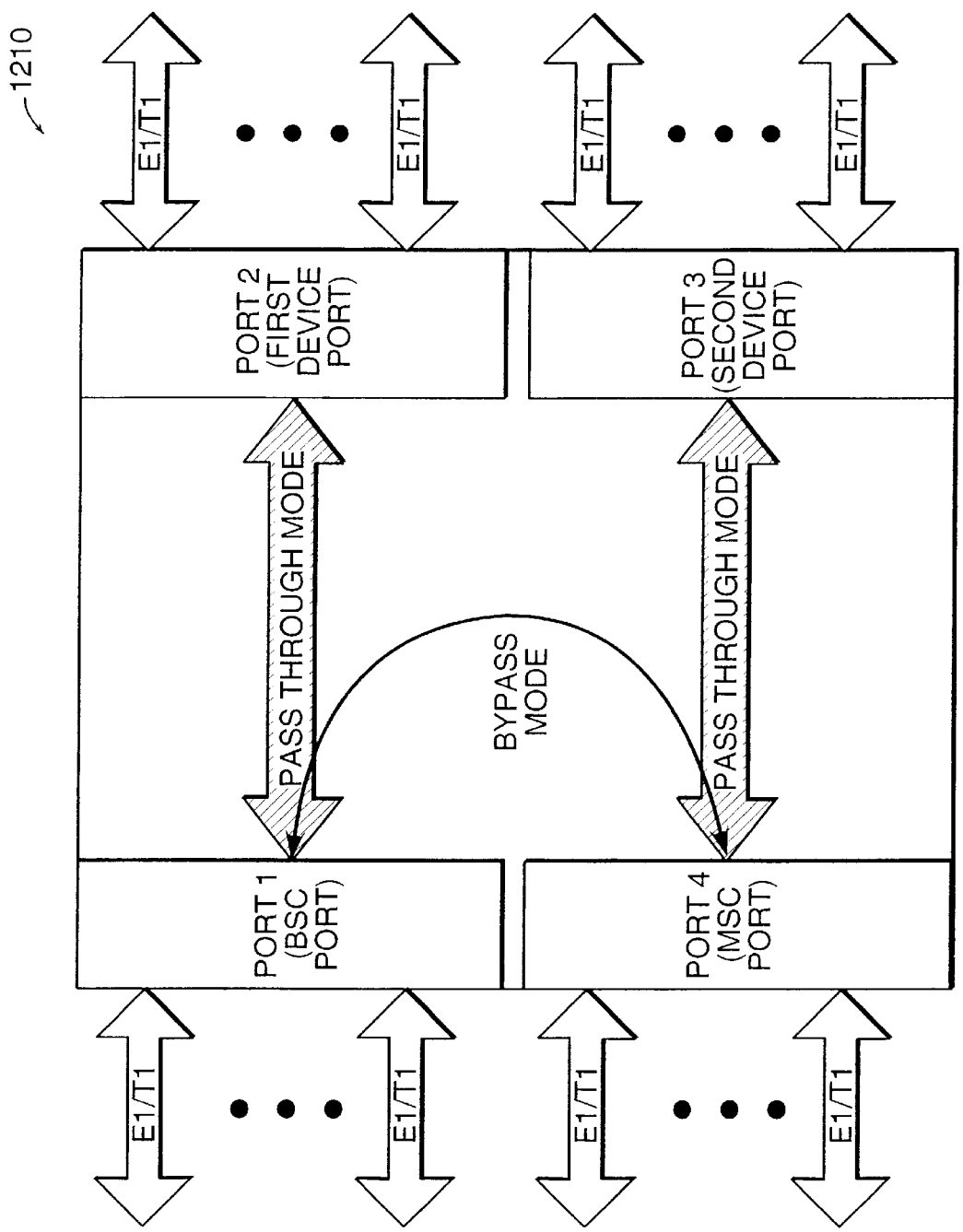
FIGS. 7–11 are schematic block diagrams of an interconnection management system.

In accordance with the invention, a bypass control switch 1210 illustrated in FIG. 7 and described below may be used to facilitate the administrator's insertion and removal (including electrical and mechanical insertion and removal) of a device such as the proxy switch described above and to provide system protection. In a telecom system using E1, T1, or J1 lines for communications, the bypass control switch can serve as a connection (including an electrical and a mechanical connection) between the BSC and the device (e.g., proxy switch) and between the device and the MSC. The bypass control switch helps to mitigate any increased risk or perceived increased risk of inserting the device into a telecom system. As noted above, the bypass control switch provides a mechanism for quickly achieving, without changing cable connections, an electrical signal isolation of the device from the BSC and the MSC together with an establishment of electrical signal connections between the BSC and the MSC. Thus, the bypass control switch provides a quick reversion to the telecom system as arranged prior to insertion of the device.

The bypass control switch provides multiple connection paths that can be controlled independently. Each of the paths includes a group of four E1/T1/J1 lines: a first port for connection to the BSC or a similar source, a second port for connection to one port in the device to be removed or inserted ("switched device", e.g., proxy switch), a third port for connection to another port on the switched device, and a fourth port for connection to the MSC or a similar source. In standard mode ("pass through mode"), the first port is connected to the second port and the third port is connected to the fourth port, which arrangement of connections isolates the BSC from the MSC and allows the switched device to communicate with the BSC and, separately, with the MSC. In bypass mode, the only connection provided is between the first line and the fourth line, which isolates the switched device from the MSC and the BSC, and allows the BSC to communicate directly with the MSC.

Actions of the bypass control switch can be initiated in multiple ways, including by removal of electrical power from the bypass control switch, and by intervention by a human user.

In the case of removal of electrical power, the bypass control switch acts by entering bypass mode, by electrically isolating the switched device from the MSC and the BSC and establishing direct electrical connections between the MSC and the BSC. The direct electrical connections so established can be maintained by the bypass control switch without the aid of electrical power. Thus, if a fault occurs that causes the switched device to lose power but leaves the MSC and BSC unaffected, the actions of the bypass control switch allow the MSC and the BSC to carry on almost immediately to provide telecom services by communicating with each other normally in the absence of the switched device.

With respect to intervention by a human user, a console interface is provided as described below to allow the human user to cause the bypass control switch to enter or exit the bypass mode.

As described below, the bypass control switch uses optical MOS ("optoMOS") relays for switching. The relays are controlled by programmable logic devices which are accessed through a microcontroller. Since the relays use optical transmission for opening and closing the connection paths, the signals being switched are substantially isolated from digital noise, and the integrity of the signal is maintained. The relays that are used have low pass through resistance to further protect the integrity of the signal. The lack of moving parts in the bypass control switch contributes to the reliability of the bypass control switch. Since the bypass mode of the bypass control switch is operative even without electrical power, the electrical signals traversing the bypass control switch in bypass mode will be active if the bypass control switch is electrically inactive.

Figure 8:
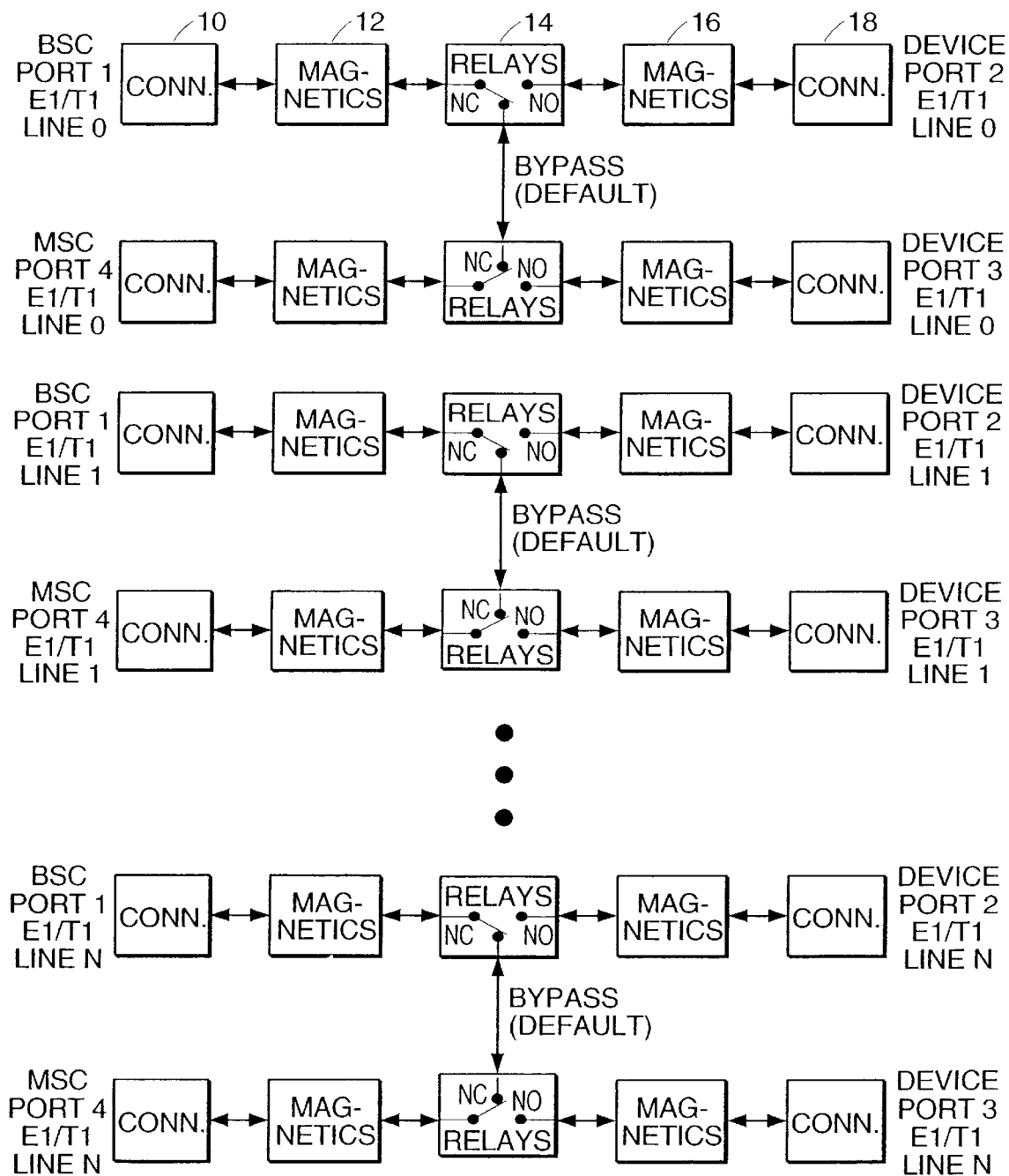

FIG. 8 is a block diagram that shows relay and port connections. In the top row, for example, a connector 10 (which may include multiple actual connectors) is connected to magnetics components 12 which are connected to relays 14. (In the case of optical MOS relays, direct connections may be used in place of the magnetics components.) Also in the top row, the relays are connected to other magnetic components 16 which are connected to another connector 18. Accordingly, connections are made between corresponding line numbers, so that, for example, line 0 of the BSC port connects to either line 0 of the MSC port (bypass mode) or to line 0 of Device Port 2 (pass through mode).

Figure 9:
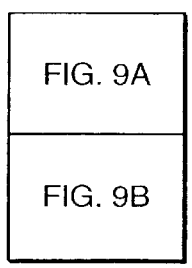
Figure 9A:
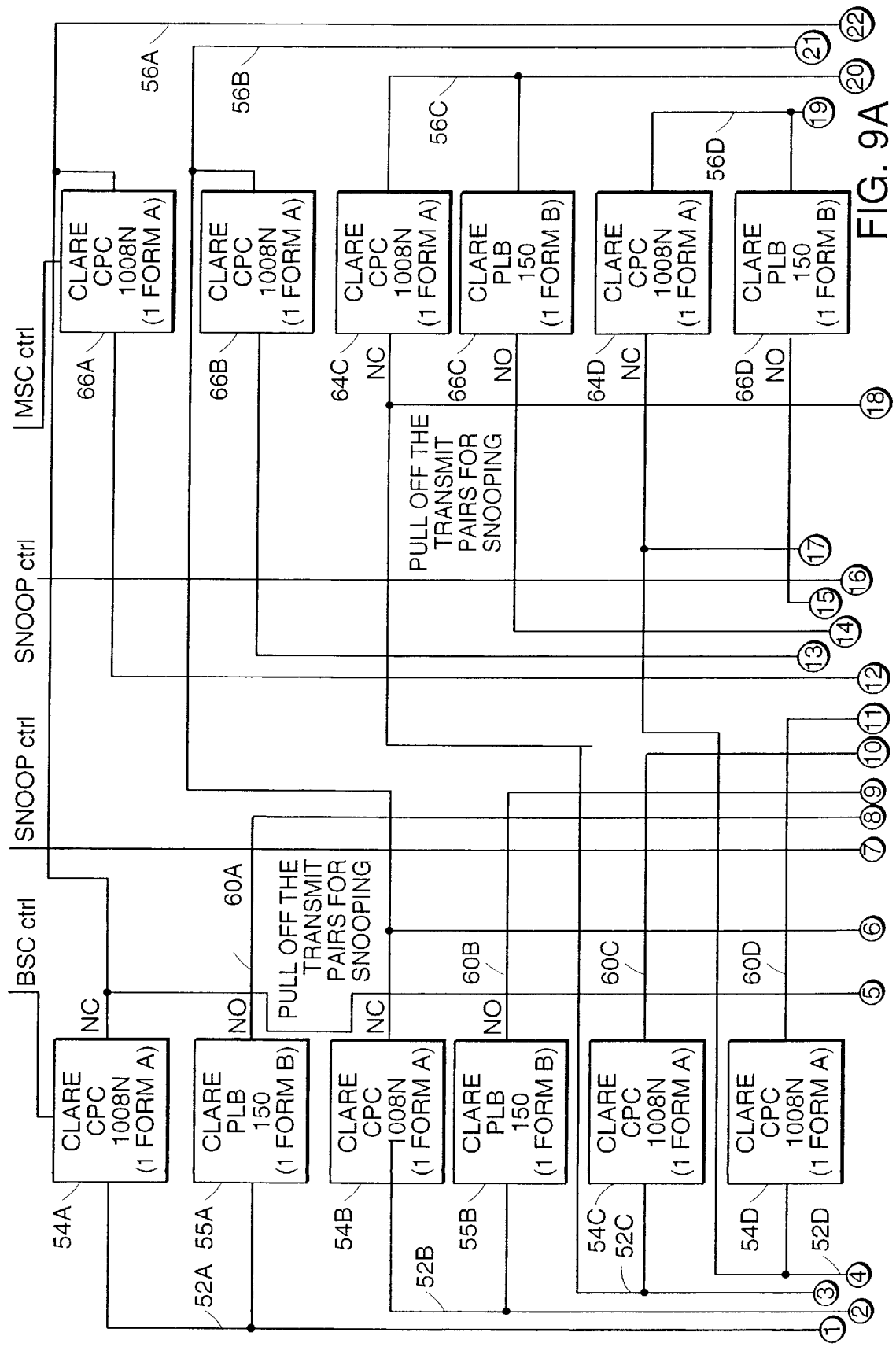
Figure 9B:
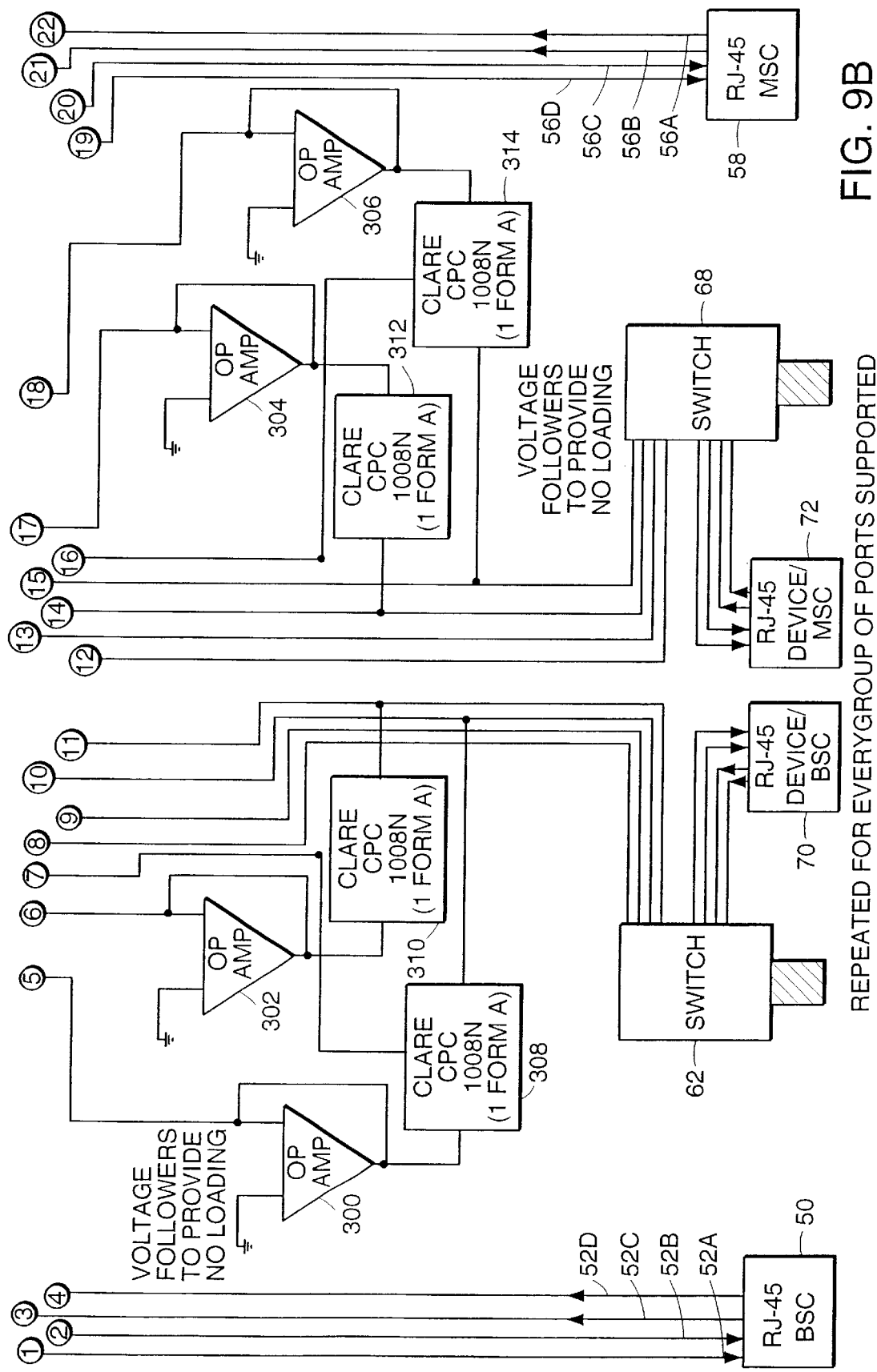

FIG. 9 is a schematic of a portion of the circuitry of the bypass control switch that is provided for each group of ports that is supported. An RJ-45 connector 50 terminates four lines 52A–52D. Relays 54A, 55A are able to connect line 52A either to line 56A which terminates at another RJ-45 connector 58, or to line 60A which terminates at a manual crossover switch 62. Relays 54B, 55B similarly are able to connect line 52B either to line 56B which terminates at connector 58, or to line 60B which terminates at crossover switch 62.

Relays 64C, 54C are able to connect line 52C either to line 56C which terminates at connector 58, or to line 60C which terminates at crossover switch 62. Relays 64D, 54D are able to connect line 52D either to line 56D which terminates at connector 58, or to line 60D which terminates at crossover switch 62.

Relays 66A–66D are able to connect lines 56A–56D, respectively, to a manual crossover switch 68.

A control signal BSCctrl controls the states of relays 54A–54D, 55A–55B, and a control signal MSCctrl controls the states of relays 64C–64D, 66A–66D. Lines 56A, 56B, 52C, 52D connect to the normally closed ("NC") terminals of relays 54A, 54B, 64C, 64D, respectively. Crossover switch 62 terminates lines connected to the normally open ("NO") terminals of relays 55A, 55B, 54C, 54D, and crossover switch 68 terminates lines connected to the NO terminals of relays 66A–66D.

Crossover switches 62, 68 (e.g., 4 pole double throw locking devices) are provided to help the user configure the bypass control switch appropriately for the types of cables (straight or crossover) that are plugged into RJ-45 connectors 70, 72 for connection to the switched device (e.g., proxy switch). Signals flow through crossover switches 62, 68 to connectors 70, 72 respectively.

When control signals BSCctrl and MSCctrl are active (pass through mode), signals may flow between connector 50 and connector 70, and between connector 58 and connector 72. When control signals BSCctrl and MSCctrl are inactive (bypass mode), or the relays become unpowered (e.g., due to a power failure), signals may flow between connector 50 and connector 58. If a BSC and an MSC are connected to connectors 50, 58 respectively, signals may flow directly between the BSC and the MSC in bypass mode. If a proxy switch is connected as well, to connectors 70, 72, and the bypass control switch is operating in pass through mode, signals may flow directly between the BSC and the proxy switch, and between the MSC and the proxy switch.

In a specific embodiment, relays 55A, 55B, 66C, 66D are implemented using Clare PLB 150 (1 form B) relays, and the other relays are implemented using Clare CPC 1008N (1 form A) relays.

FIG. 9 also shows operational amplifiers and other relays that may be included as described below.

Figure 10:
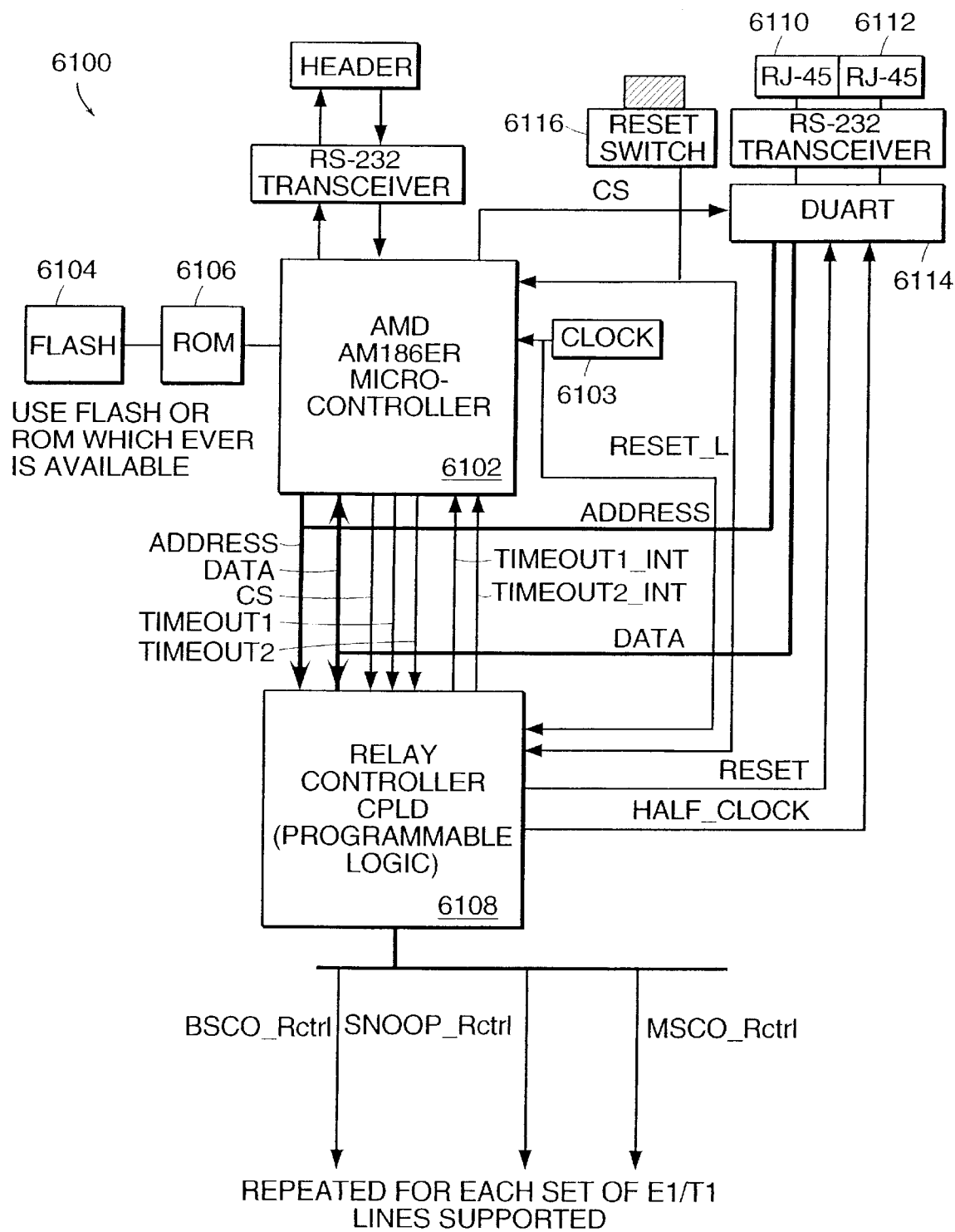

Control signals BSCctrl and MSCctrl may be controlled by control logic 6100 as shown in FIG. 10. An AMD Am186ER microcontroller 6102, driven by a clock 6103 and operating according to program instructions resident in flash memory 6104 or read only memory 6106 or both, directs the operations of programmable logic 6108 for relay control using control signals BSC0_Rctrl and MSC0_Rctrl (equivalent to BSCctrl and MSCctrl). The microcontroller communicates across management console ports 6110, 6112 using an RS-232 serial DUARTS device 6114. An external reset switch 6116 provides a mechanism for resetting the bypass control switch.

FIG. 10 also shows a control signal Snoop_Rctrl that may be included and used as described below.

Figure 11:
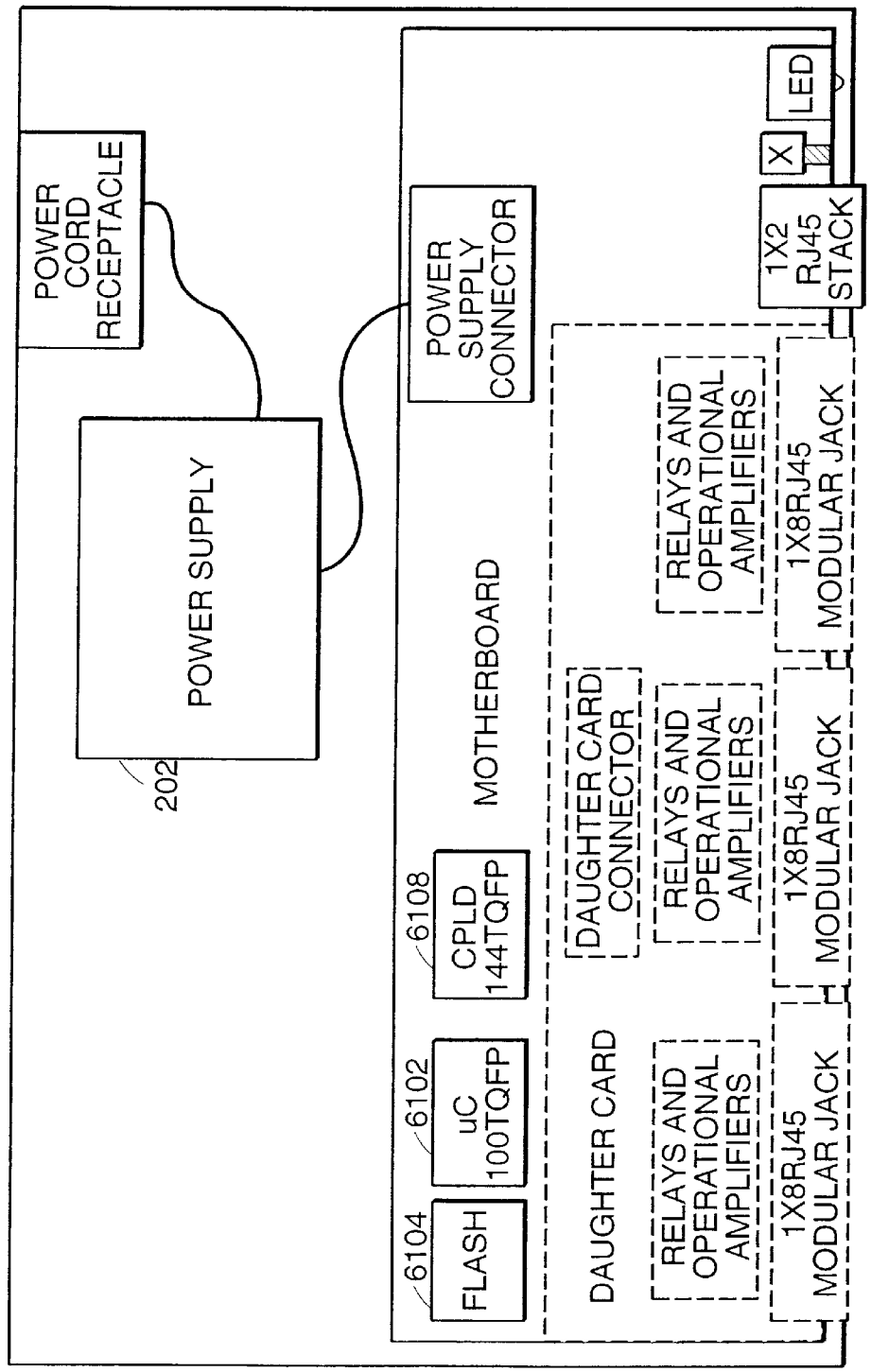

FIG. 11 illustrates a block diagram 200 showing microcontroller 6102, flash memory 6104, programmable logic 6108, and sets of circuitry portions illustrated in FIG. 17. A power supply 202 is provided that sources 3.3 volts and 5 volts (and, in an enhanced implementation, −5 volts) from 120 or 220 volts AC or from 48 volts DC.

The above embodiments facilitate the realization of fault recovery using a bypass control switch and, e.g., a proxy switch. Subsets of the functionality, however, still provide advantages over the state of the art. For example, as shown in FIG. 9, the active signals traversing the bypass control switch may be monitored through the inactive connection paths when the bypass control switch is in bypass mode. Operational amplifiers (e.g., amplifiers 300, 302, 304, 306 in FIG. 9), powered by +5 and −5 voltages sources from the power supply, may be used as voltage followers to provide isolation between the inactive connection paths and the active signals traversing the bypass control switch. The operational amplifiers, which have nearly infinite input impedance, would not significantly load down the active signals and would not affect the integrity of the active signals. The operational amplifier outputs may be connected to the inactive connectors 70, 72 by optical MOS relays (e.g., relays 308, 310, 312, 314 in FIG. 9). The relays may be responsive to control signal Snoopctrl (equivalent to signal Snoop_Rctrl in FIG. 10) that causes the outputs to disconnect from the connectors when the switch is taken out of bypass mode and set to pass through mode.

In another example, the control logic 6100 of the bypass control switch may be enhanced with the ability to monitor the functional status of the switched device. If the bypass control switch determines that the switched device is not sufficiently functional, the bypass control switch may automatically logically remove the switched device from the system by placing the bypass control switch in bypass mode.

Further enhancements (e.g., additional logic, relays, and operational amplifiers) may be added to allow the bypass control switch to function as a repeater for signals, e.g., E1/T1/J1 signals, at least when the bypass control switch has electrical power.

Having described an exemplary embodiment, it should be apparent to persons of ordinary skill in the art that changes may be made to the embodiment described without departing from the spirit and scope of the invention.

For example, a variation of the bypass control switch may include magnetic devices and mechanical relays, e.g., in place of the optical MOS relays. The magnetic devices provide noise emission isolation from the on board logic. Placing the magnetic devices between the RJ-45 connectors and the mechanical relays maintains the integrity of the switched signals and protection from the on board logic. The mechanical relays may perform the actual signal switching functions in the same manner as the optical MOS relays.

What is claimed is:

1. A method for use in managing interconnections in a mobile communications network having at least one mobile switching center (MSC) and at least one base station subsystem (BS), wherein the MSC and BS each communicate signaling messages according to a mobile signaling protocol, the method comprising:

providing a first connection between a first device and a second device in the network, the first device including a proxy switch for use in the network, the proxy switch comprising signaling message handling logic for receiving messages from the MSC and BS in accordance with said mobile signaling protocol; message interception logic, cooperating with the signaling message handling logic, for sending an acknowledgment message to an MSC or BS that transmits a signaling message received by the signaling message handling logic and for preventing the signaling messages from being forwarded to the other of the BS and MSC respectively; message conversion logic, cooperating with the signaling message handling logic, for converting a signaling message received by the signaling message handling logic from one of the MSC and BS into a converted signaling message for transmission to the other of the BS and MSC, respectively; and message transmission logic, cooperating with signaling message handling logic, for transmitting signaling messages from one of the MSC and the BS to the other of the BS and MSC, respectively;

providing a second connection between the first device and a third device in the network;

determining that a condition exists in the network that affects the operation of the first device; and establishing a third connection between the second device and the third device in the network.

2. The method of claim 1, wherein the second device includes a base station subsystem (BS).

3. The method of claim 1, wherein the second device includes a mobile switching center (MSC).

4. The method of claim 2, wherein the third device includes a mobile switching center (MSC).

5. The method of claim 1, wherein the condition includes a loss of electrical power to the proxy switch.

6. The method of claim 2, wherein the condition includes a loss of electrical power to the proxy switch.

7. The method of claim 3, wherein the condition includes a loss of electrical power to the proxy switch.

8. The method of claim 1, wherein the condition includes a problem with the first device.

9. The method of claim 1, wherein the condition includes a loss of electrical power.

10. The method of claim 1, wherein the third connection is established passively.

11. The method of claim 1, wherein the condition includes an indication of a user selection.

12. The method of claim 1, further comprising removing at least one of the first and second connections.

13. The method of claim 1, further comprising electrically isolating the first device from at least one of the second and third devices.

14. The method of claim 1, wherein at least one of the first, second, and third connections includes at least a portion of a T1 connection.

15. The method of claim 1, wherein at least one of the first, second, and third connections utilizes an optical MOS relay.

16. A method for use in managing interconnections in a mobile communications network having at least one mobile switching center (MSC) and at least one base station subsystem (BS), wherein the MSC and BS each communicate signaling messages according to a mobile signaling protocol, the method comprising:

determining that a condition exists in the network that affects the operation of a device in the network, the device including a proxy switch for use in the network, the proxy switch comprising signaling message handling logic for receiving messages from the MSC and BS in accordance with said mobile signaling protocol; message interception logic, cooperating with the signaling message handling logic, for sending an acknowledgment message to an MSC or BS that transmits a signaling message received by the signaling message handling logic and for preventing the signaling messages from being forwarded to the other of the BS and MSC respectively; message conversion logic, cooperating with the signaling message handling logic, for converting a signaling message received by the signaling message handling logic from one of the MSC and BS into a converted signaling message for transmission to the other of the BS and MSC, respectively; and message transmission logic, cooperating with signaling message handling logic, for transmitting signaling messages from one of the MSC and the BS to the other of the BS and MSC, respectively; and causing the network to operate in a manner that is consistent with the absence of the device from the network.

17. A system for use in managing interconnections in a mobile communications network having at least one mobile switching center (MSC) and at least one base station subsystem (BS), wherein the MSC and BS each communicate signaling messages according to a mobile signaling protocol, the method comprising:

a first mechanism responsive to a condition existing in the network that affects the operation of a device in the network, the device including a proxy switch for use in the network, the proxy switch comprising signaling message handling logic for receiving messages from the MSC and BS in accordance with said mobile signaling protocol; message interception logic, cooperating with the signaling message handling logic, for sending an acknowledgment message to an MSC or BS that transmits a signaling message received by the signaling message handling logic and for preventing the signaling messages from being forwarded to the other of the BS and MSC respectively; message conversion logic, cooperating with the signaling message handling logic, for converting a signaling message received by the signaling message handling logic from one of the MSC and BS into a converted signaling message for transmission to the other of the BS and MSC, respectively; and message transmission logic, cooperating with signaling message handling logic, for transmitting signaling messages from one of the MSC and the BS to the other of the BS and MSC, respectively; and a second mechanism responsive to the first mechanism and operative to electrically isolate the device from the network.

18. The system of claim 17, further comprising a third mechanism responsive the first mechanism and operative to allow signals to bypass the device.

19. The system of claim 17, wherein the condition includes a loss of electrical power to the proxy switch.

20. The system of claim 17, wherein the device is logically disposed between a base station subsystem (BS) and a mobile switching center (MSC).

21. The system of claim 17, wherein the condition includes a problem with the first device.

22. The system of claim 17, wherein the condition includes a loss of electrical power.

23. The system of claim 17, wherein the condition includes a loss of electrical power to the device.

24. The system of claim 17, wherein the condition includes an indication of a user selection.

25. The system of claim 17, wherein the device includes at least a portion of a T1 connection.

26. The system of claim 17, wherein the second mechanism includes an optical MOS relay.

27. The system of claim 18, wherein the third mechanism includes an optical MOS relay.

* * * * *